United States Patent [19]
Calhoun et al.

[11] Patent Number: 5,643,668
[45] Date of Patent: Jul. 1, 1997

[54] TAPE FOR ROUGH SURFACES

[75] Inventors: Clyde D. Calhoun, Stillwater; James G. Berg, Lino Lakes, both of Minn.

[73] Assignee: Minnesota Mining and Manufacturing Company, St. Paul, Minn.

[21] Appl. No.: 366,815

[22] Filed: Dec. 30, 1994

[51] Int. Cl.$^6$ .................................................. B32B 7/12
[52] U.S. Cl. ...................... 428/354; 428/343; 428/317.3
[58] Field of Search ................................. 428/354, 317.3, 428/317.1, 343, 245, 246

[56] References Cited

U.S. PATENT DOCUMENTS

| | | | |
|---|---|---|---|
| Re. 24,906 | 12/1960 | Ulrich | 206/59 |
| 2,532,011 | 11/1950 | Dahlquist et al. | 154/53 |
| 3,239,478 | 3/1966 | Harlan, Jr. | 260/27 |
| 3,240,330 | 3/1966 | Christmas | 206/59 |
| 3,318,852 | 5/1967 | Dixon | 260/78 |
| 3,522,140 | 7/1970 | Hartzell et al. | 428/317.3 |
| 3,551,391 | 12/1970 | Crocker et al. | 260/78 |
| 3,897,295 | 7/1975 | Dowbenko et al. | 156/295 |
| 3,967,031 | 6/1976 | Lambert | 428/294 |
| 3,978,274 | 8/1976 | Blum | 428/476 |
| 4,181,752 | 1/1980 | Martens et al. | 427/54 |
| 4,223,067 | 9/1980 | Levens | 428/308 |
| 4,548,862 | 10/1985 | Hartman | 428/323 |
| 4,629,663 | 12/1986 | Brown et al. | 428/343 |
| 4,654,254 | 3/1987 | Gerry et al. | 428/354 X |
| 4,705,715 | 11/1987 | De Coste, Jr. et al. | 428/317.3 X |
| 4,734,304 | 3/1988 | Tsubone et al. | 428/35 |
| 4,780,367 | 10/1988 | Lau et al. | 428/355 |
| 4,822,687 | 4/1989 | Kessel et al. | 428/447 |
| 4,833,179 | 5/1989 | Young et al. | 522/183 |
| 4,889,753 | 12/1989 | Brown et al. | 428/40 |
| 4,935,270 | 6/1990 | Read et al. | 428/34 |
| 4,980,222 | 12/1990 | Rivera et al. | 428/195 |
| 5,034,251 | 7/1991 | Read et al. | 428/34 |
| 5,087,148 | 2/1992 | Wyckoff | 404/12 |
| 5,130,185 | 7/1992 | Ness | 428/40 |
| 5,139,590 | 8/1992 | Wyckoff | 156/71 |
| 5,141,790 | 8/1992 | Calhoun et al. | 428/354 X |
| 5,144,051 | 9/1992 | Kessel et al. | 556/64 |
| 5,149,578 | 9/1992 | Wheatley et al. | 428/213 |
| 5,153,042 | 10/1992 | Indrelie | 428/40 |
| 5,217,805 | 6/1993 | Kessel et al. | 428/352 |
| 5,232,764 | 8/1993 | Oshima | 428/173 |
| 5,242,738 | 9/1993 | Furuya et al. | 428/172 |
| 5,246,762 | 9/1993 | Nakamura | 428/172 |
| 5,264,264 | 11/1993 | Shibata et al. | 428/40 |
| 5,273,805 | 12/1993 | Calhoun et al. | 428/156 |
| 5,413,829 | 5/1995 | Brown et al. | 428/354 X |

FOREIGN PATENT DOCUMENTS

| | | |
|---|---|---|
| 264959 | 4/1988 | European Pat. Off. . |
| 62-86079 | 4/1987 | Japan . |
| WO 91/13752 | 9/1991 | WIPO . |

*Primary Examiner*—Daniel Zirker
*Attorney, Agent, or Firm*—Gary L. Griswold; Walter N. Kirn; Lucy C. Weiss

[57] ABSTRACT

A tape for adhering to rough surfaces in which an adhesive layer is adhered to a backing in a manner to allow discontinuities of adhesion between the backing and the adhesive layer. The backing is deformable and recoverable to form a generally smooth surface.

25 Claims, 2 Drawing Sheets

TAPE FOR ROUGH SURFACES

FIELD OF THE INVENTION

The present invention relates to an adhesive tape for attachment to a rough surface, and more particularly, to an adhesive tape that adheres to a rough surface while allowing the backing to remain substantially smooth and flat.

BACKGROUND OF THE INVENTION

It is difficult to adhere conventional adhesive tape constructions to substrates having rough surfaces without compromising either a strong adhesive bond to the substrate or a smooth, flat appearance of the backing. With most conventional tape constructions application pressure causes the tape backing and adhesive to distort and generally conform to the surface topology of the substrate surface. On removal of this pressure the tape attempts to return to its original undeformed condition because of the elastic and anelastic properties of the backing and the adhesive, thereby creating stresses at the adhesive/backing and adhesive/substrate surface interfaces. When tape constructions having stiff, yet deformable backings are adhered to rough substrate surfaces, the attempt to return to the original, undistorted configuration typically causes an adhesive failure at the adhesive/substrate surface interface as the adhesive is pulled away from the recesses on the substrate surface as the backing returns to a smooth, flat configuration. As a result, the contact area between the adhesive and the substrate can be reduced to the point that the adhesive tape does not adhere to the substrate surface. Tape constructions which utilize softer, readily deformable backings in combination with adhesives that form very strong adhesive bonds to the rough substrate surface are typically unable to return to a smooth, flat configuration as the strength of the adhesive bond is greater than the restorative forces of the backing.

One approach to reducing adhesive failure problems at the adhesive/substrate surface interface involves the use of a thicker layer of a more conformable adhesive than is typically used in conventional tape constructions. However, increasing the adhesive thickness adds cost to the tape and often results in adhesive oozing or flowing out beyond the backing. Adhesive ooz or flow is extremely undesirable when the adhesive construction is a decorative material or wall covering. Adhesive ooz is also a serious problem when a tape construction is formed into a roll for shipping purposes. Finally, if pressure is applied to the backing after the tape is applied to the rough substrate surface, additional adhesive oozing along the edges of the backing can occur.

Yet another attempt to overcome the problem of an adhesive failure at the adhesive/substrate surface interface is to utilize a backing that deforms by plastic deformation, such as an annealed metal foil backing. Backings of this type typically have little, if any restoring forces so that the tape construction will remain conformed to the topology of the rough substrate surface when application forces are removed. However, this solution fails to provide a backing that assumes a substantially smooth and flat configuration after attachment to the rough surface.

Still another attempt to overcome the above-noted problems is to utilize a foam intermediate layer between the backing and the adhesive which allows the adhesive to remain in contact with the substrate surface while the backing can return to a smooth, flat configuration. However, a comparatively thick layer of a compliant foam is required to achieve the desired balance between conformability to the rough surface and allowing the backing of the tape to return to a smooth, flat configuration.

SUMMARY OF THE INVENTION

The present invention is directed to adhesive tape constructions for adhering to rough surfaces in which an adhesive layer is attached to a backing in a manner to allow discontinuities of attachment between the backing and the adhesive layer. The backing is deformable and has elastic and anelastic properties of sufficient magnitude to create a recovery force that will allow the tape backing to substantially return to its original flat configuration. The deformability allows the tape construction to generally conform to the rough surface under application pressure. The recovery force and the discontinuities of attachment permit the backing to assume a substantially flat and smooth configuration without detaching the adhesive tape from the rough surface upon the removal of the application pressure, although it is understood that a limited amount of localized debonding can occur.

The discontinuities of attachment can be achieved by using an intermediate layer between the adhesive layer and the backing that is discontinuously attached to the backing. Like the backing, the intermediate layer is preferably deformable, although it typically has a recovery force that is less than the recovery force of the backing. In this way, the intermediate layer can conform to the substrate surface while the backing recovers to assume a substantially flat and smooth configuration. In an alternative embodiment, a layer of a release material can be interposed between the backing and the adhesive. In this embodiment, the release material can be pattern coated on the backing, or on the adhesive, to form regions with no release material, thereby permitting attachment of the adhesive directly to the backing only at these predetermined locations. Alternatively, a continuous release material can be treated to form a pattern of nonrelease areas to which the adhesive can adhere, thereby permitting attachment of the adhesive to the backing only at these predetermined locations. Thus, encompassed within the present invention are embodiments wherein the adhesive layer is directly attached to the backing as well as attached to the backing through an intermediate layer.

The present invention is also directed to items such as a decoration or sign which can be adhered to a rough surface. One side of the backing can include indicia, wall decorations, such as wallpaper, or other decorative items, while the other side of the backing includes an adhesive layer adhered in a manner to allow discontinuities of adhesion between the backing and the adhesive.

In this application:

"adhesive" refers to the adhesive composition, and may also refer to the adhesive layer of an adhesive tape;

"backing" means any deformable thin, flexible sheet or carrier web having elastic and anelastic properties of sufficient magnitude to create a recovery force that will allow the backing to substantially return to its original flat configuration;

"recovery force" means the elastic or anelastic forces created by deforming the backing from its original undeformed configuration;

"sheet" means a thin, large surface area tape that can be rectangular in shape or in other configurations such as alphanumeric characters;

"tack" means instant contact adhesion between the adhesive and the substrate surface, the tack may be substrate specific; and "rough surface" refers to a wide variety of surfaces on substrates having elevated and recessed areas, including, for example, cinder blocks, concrete, foam insulation, rough wood surfaces, such as particle board or plywood, corrugated paper board, or textured wall coverings.

DETAILED DESCRIPTION

Figure 1A:
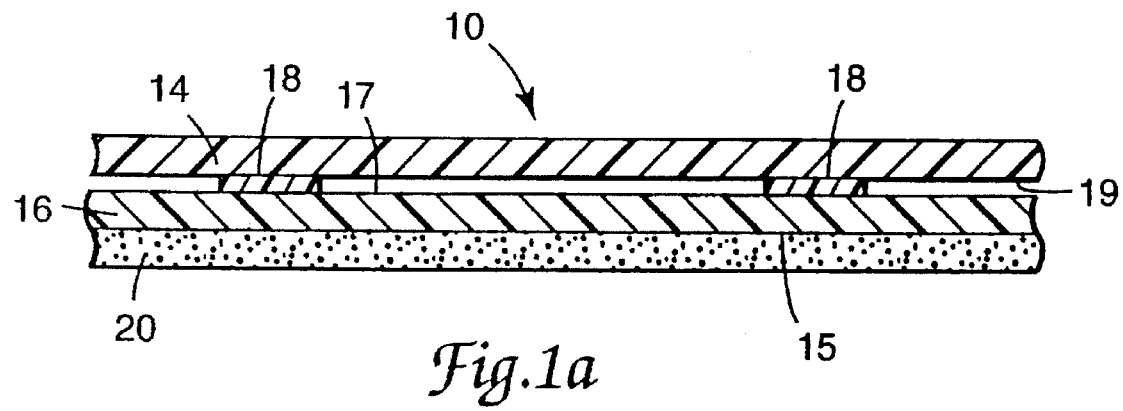
FIG. 1a is a sectional view of an exemplary embodiment of an adhesive tape for rough surfaces prior to being adhered to a substrate.

The adhesive tapes of the present invention are designed for application to substrates having rough surfaces. That is, the adhesive tapes are designed such that they will achieve strong adhesive bonds to rough surfaces yet have a substantially smooth and flat backing. Generally, the adhesive tapes utilize a deformable backing having elastic and anelastic properties of sufficient magnitude to create a recovery force that will allow the tape backing to substantially return to its original flat configuration, and an adhesive layer attached to a first surface of the backing in a manner to allow discontinuities of attachment between the backing and the adhesive layer. When subjected to application pressure, such as finger pressure, the tape substantially conforms to the topology of the rough surface, thereby creating contact between the adhesive layer and the surface. Upon the removal of this pressure, the recovery force and the discontinuities of attachment permit the backing to assume a substantially flat and smooth configuration without detaching the adhesive layer from the rough surface, although minor amounts of localized debonding of the adhesive from the rough surface can occur. As used in this application, the phrase "substantially flat and smooth configuration" means that the tape backing has a planar appearance which may contain a minor number of rolling undulations and it is substantially free of sharp undulations or dimples.

The discontinuities of attachment can be achieved by using an intermediate layer between the adhesive layer and the backing. This intermediate layer is discontinuously attached to the backing. In preferred embodiments, the intermediate layer is deformable, although it typically has a recovery force that is less than the recovery force of the backing. In this way, the intermediate layer can generally conform to the rough substrate surface while the backing recovers to assume a substantially flat and smooth configuration. As used in this application, the phrase "generally conform" means that the intermediate layer follows the topography of the substrate except for deeper depressions where it may follow only the upper portions of the depression walls and then bridge across to the opposite wall of the depression. Alternatively, an initially continuous intermediate layer having limited conformability and/or cohesive strength could tear when subjected to application pressure to produce a similar result. Furthermore, the intermediate layer could be discontinuous. The recovery force of the intermediate layer should not debond the adhesive layer from the rough substrate surface to such an extent that the adhesive tape detaches from the surface. That is, the intermediate layer should be chosen such that localized debonding is insufficient to cause the tape to detach from the surface.

In another aspect of the invention, a release material or a particulate material can be positioned between the backing and the adhesive layer. The release material or the particulate material can be applied to the backing or to the adhesive. For example, a release material can be pattern coated on the backing to form areas on the backing without the release coating, or a continuous release coating can be treated to form a pattern of nonrelease areas to which the adhesive can adhere. In this way, the adhesive is discontinuously attached to the backing and thus can allow the backing to substantially return to a smooth flat surface. As another example, a layer of a particulate material such as glass beads can be discontinuously applied to the adhesive. With the use of particulate material, additional bonding sites between the backing and the adhesive can also be indexed to the raised portions of the rough surface at the time the adhesive tape is applied to the surface. Alternatively, the release material and particulate material can be used in combination.

The adhesive tapes of the present invention can be in the form of sheets, films, as well as masking tapes, photographic and other layout tapes, for example. They can be used in a variety of applications such as in decorative and informative markings on vehicles; signage; buildings; fascia; awnings; wallpaper; and the like. The backing can include additional functional and decorative layers, such as clear coats, decorative adhesive layers, screen printable inks, barrier layers, adhesion promoters, multilayers of translucent films, and the like. Such functional and decorative layers are known in the art and can be used, or laminated according to techniques known to those skilled in the art.

Figure 1B:
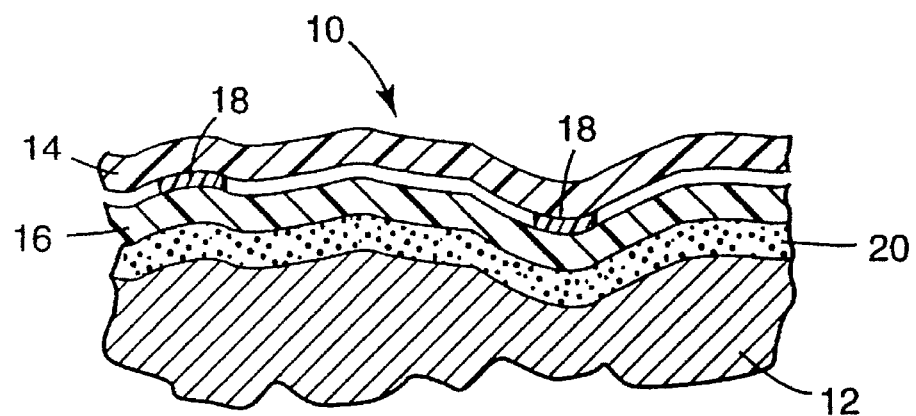
FIG. 1b is a sectional view of the adhesive tape of FIG. 1a shortly after being adhered to a rough surface.
Figure 1C:
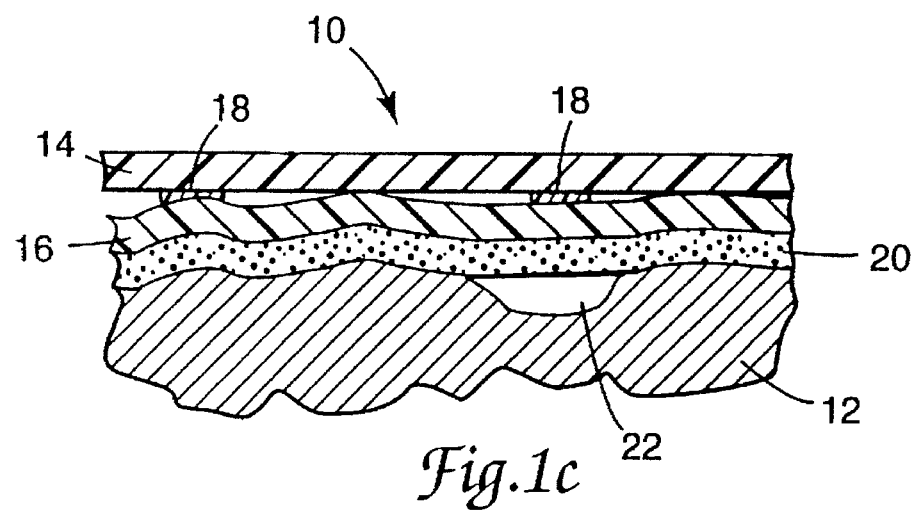
FIG. 1c is a sectional view of the adhesive tape of FIG. 1b after a period of time.

FIGS. 1a through 1c illustrate an adhesive tape 10 of the invention for adhering to a substrate 12 having a rough surface. The adhesive tape 10 has a backing 14, an intermediate layer 16 having a first surface 15 and a second surface 17, and an adhesive layer 20. The backing 14 is selectively attached to the second surface 17 of the intermediate layer 16 at a plurality of attachment sites 18, as will be discussed in more detail below. The adhesive layer 20 is adhered to the first surface 15 of the intermediate layer 16 for attachment to the substrate 12 (see FIGS. 1b and 1c).

In the embodiment of FIG. 1a, a tacking material can be applied to a first surface 19 of the backing 14, or to the second surface 17 of the intermediate layer 16, through a stencil or mask having openings corresponding to the attachment sites 18. The intermediate layer 16 is thus attached to the backing 14 only at the sites 18. Alternatively, the intermediate layer 16 can be spot-welded by mechanical or thermomechanical techniques to the backing at the attachment sites 18. Preferably, the spacing between the centers of the attachment sites is greater than the spacing between centers of the high points on the rough surface.

The adhesive of layer 20 can be any adhesive suitable for attachment to the substrate 12. It can be a pressure sensitive adhesive, a hot melt adhesive, etc. It can be applied to the entire first surface 15 of the intermediate layer 16 or it can be applied to predetermined locations on the first surface of the intermediate layer (see FIG. 2). Either way, the adhesive can be applied by a wide variety of techniques.

In FIG. 1b, the adhesive tape 10 is pressed against the rough surface of substrate 12 with a sufficient amount of pressure so that the backing layer 14, the intermediate layer 16, and the adhesive layer 20 all generally conform to the topology of substrate 12. In FIG. 1c, the application pressure has been removed and the backing 14 has recovered to a substantially smooth, flat surface as a result of the recovery force produced by its elastic and anelastic forces, and has generally separated from the intermediate layer 16 except at the attachment sites 18. The intermediate layer 16 and adhesive layer 20 continue to generally follow the topology of the substrate 12. However, it will be understood that the backing 14 and/or intermediate layer 16 can have a recovery force sufficient to separate the adhesive layer 20 from a portion of the substrate 12, such as at location 22, although the total area of such separations is insufficient to cause the adhesive tape to detach from the rough surface. Preferably, localized debonding occurs only when an attachment site 18 between the backing 14 and the intermediate layer 16 is over a recess in the rough surface.

Referring to FIGS. 1a through 1c, there are five general forces to consider in selecting materials for the backing, intermediate layer, and adhesive: (1) the adhesive bond between the adhesive layer and the surface of the substrate; (2) the adhesive bond between the adhesive layer and the intermediate layer; (3) the recovery force of the intermediate layer; (4) the bond between the intermediate layer and the backing; and (5) the recovery force of the backing. The recovery force of the backing should be the strongest of the five forces. The bond between the intermediate layer and the backing should be stronger than either of the forces (1)–(3). The adhesive bond between the adhesive layer and the intermediate layer should be stronger than the recovery force of the intermediate layer. Finally, the adhesive bond between the adhesive layer and the surface of the substrate can be equivalent to the adhesive bond between the adhesive layer and the intermediate layer. Preferably, the adhesive bond between the adhesive layer and the intermediate layer is stronger than the adhesive bond between the adhesive layer and the surface of the substrate to facilitate removal of the tape and minimize adhesive residue on the substrate surface. It will be understood by one of skill in the art that these qualifications are for the embodiment in which the intermediate layer is continuous and deformable. Furthermore, it will be understood that the strength of the bond between the adhesive and the substrate and/or the adhesive and the intermediate layer can increase with time.

Figure 2:
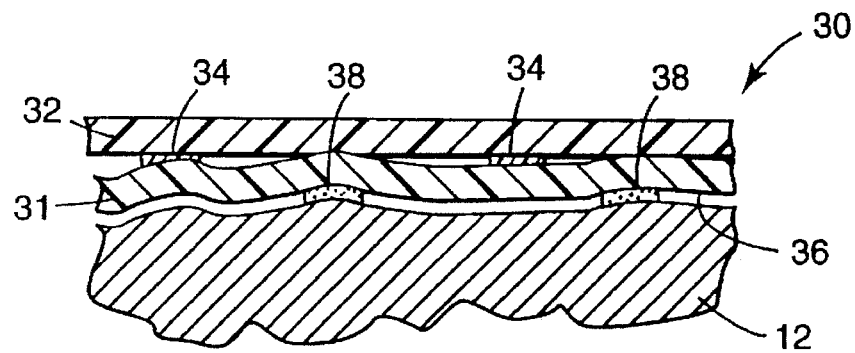
FIG. 2 is a sectional view of an alternative embodiment of an adhesive tape for rough surfaces in which an adhesive is distributed at predetermined locations on both the backing and the intermediate layer.

FIG. 2 is an alternative embodiment in which an intermediate layer 31 of adhesive tape 30 is attached to a backing 32 at a plurality of attachment sites 34 either through the use of a tacking material or spot welding, as discussed above. However, a first surface 36 of the intermediate layer 31 also has a discontinuous adhesive layer, i.e., adhesive only at predetermined locations. Thus, in this embodiment the adhesive layer forms discontinuous bonding sites 38. Preferably, the periodicity of these bonding sites is equal to or smaller than the periodicity of the attachment sites between the backing and the intermediate layer. Also, preferably, the periodicity of these bonding sites is greater than the periodicity of the high points on the rough surface.

Furthermore, in the embodiment shown in FIG. 2, the bonding sites 38 are preferably offset from the attachment sites 34 to permit the intermediate layer 31 to deform sufficiently to permit the backing 32 to assume a substantially flat and smooth surface. It will be understood that the intermediate layer 31 will initially deform as a unitary structure to the extent possible. However, in some circumstances, the topology of a rough surface can be sufficiently great so that the intermediate layer will fracture, e.g., tear.

Figure 3:
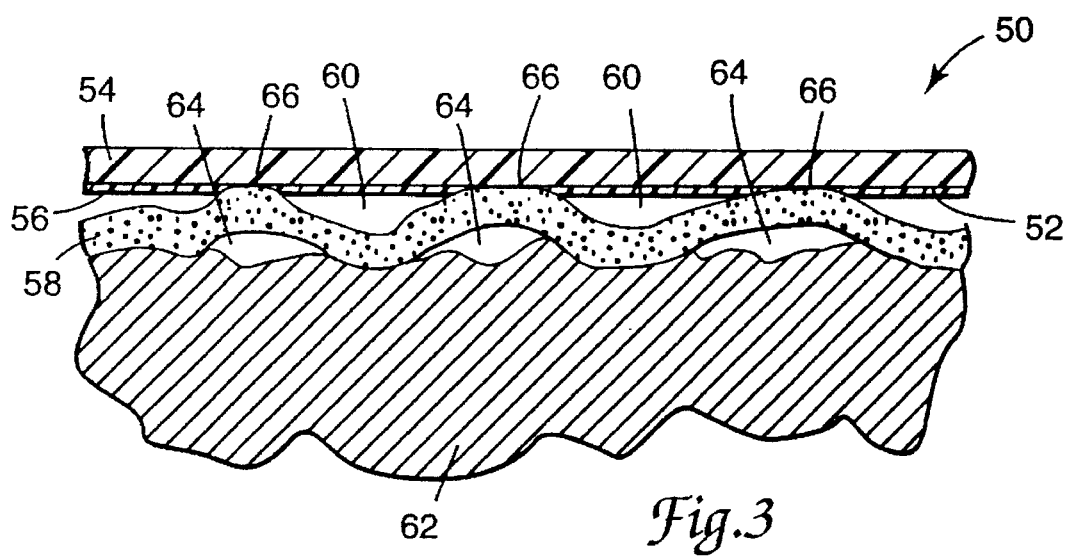
FIG. 3 is a sectional view of an alternative embodiment of an adhesive tape for rough surfaces in which the adhesive is selectively attached to the backing as a result of a release material.

FIG. 3 illustrates another embodiment of an adhesive tape 50 in which a layer of a release material 56 is coated on a first surface 52 of a backing 54. The release material 56 permits the adhesive layer 58 to adhere to the backing 54 only at predetermined locations 66, while allowing the adhesive to separate from the backing 54 at locations 60. The adhesive layer 58 conforms to the topology of the substrate 62 when the adhesive tape 50 is applied to it. However, the recovery force of the backing 54 separates the adhesive layer 58 from the substrate 62 at locations 64. It will be understood that it is desirable to select an adhesive 58 with an recovery force that is generally less than the recovery force of the backing to prevent the tape detaching from the rough surface of the substrate.

In one embodiment, the layer of release material 56 can be a patterned release coating attached to backing 54. The adhesive layer 58 adheres to the backing 54, but not the layer of release material 56. The release material can be a layer of silicone, for example, the release characteristics of which can be modified by the use of particles such as glass beads. Besides patterning this release material so the adhesive layer 58 can adhere to the backing 54 at locations 66, the release material can be chemically or thermally treated at predetermined locations to permit adhesion of the adhesive layer 58 only at those locations. In this embodiment, the adhesive is a continuous layer discontinuously bonded to the backing. The recovery forces of the backing typically cause this continuous adhesive layer to discontinuously bond to the rough surface.

Figure 4:
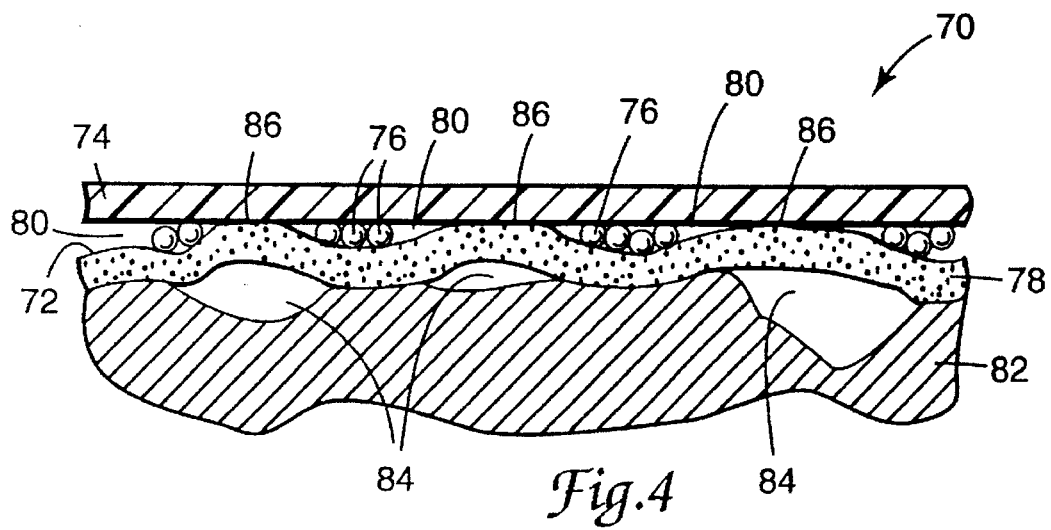
FIG. 4 is a sectional view of an alternative embodiment of an adhesive tape for rough surfaces in which the adhesive is selectively attached to the backing as a result of a particulate release material.

Alternatively, a layer of a particulate material such as glass beads can be interposed between the backing and the adhesive layer. Such particles allow for the formation of a self-indexing adhesive tape, wherein point bonds at the adhesive substrate interface can be formed corresponding to the high points of the surface. FIG. 4 illustrates an adhesive tape 70 in which a layer of a particulate material 76 is attached to a first surface 72 of an adhesive layer 78. The particulate material 76 permits the adhesive layer 78 to adhere to the backing 74 only at predetermined locations 86, while allowing the adhesive layer 78 to separate from the backing 74 at locations 80. As in the embodiment in FIG. 3, the adhesive layer 78 conforms to the topology of the substrate 82 when the adhesive tape 70 is applied to it; however, the recovery force of the backing 74 separates the adhesive layer 78 from the substrate 82 at locations 84.

As with the embodiment represented by FIG. 3, the layer of particulate material 76 can be a patterned layer. Although it could be applied to the backing, it is frequently more convenient to apply the particulate material to the adhesive layer 78. Alternatively, the particulate material 76 can be applied to the backing 74 or adhesive layer 78 in one continuous layer. Upon application of the adhesive tape to a rough surface, the particulate material can be pushed beneath the surface of the adhesive as a result of high points on the rough surface creating an adhesive bond between the adhesive and backing bond at those locations. This embodiment is referred to herein as a self-indexing adhesive tape.

The backing can be made from a wide variety of materials that deform, e.g., elongate, under application pressure but substantially return to their original configuration on removal of the application pressure as a result of their elastic and anelastic properties. The backing can be made from naturally occurring or synthetic materials. Preferably, the backing is made of a synthetic polymeric material. Suitable polymeric materials include, but are not limited to: polyolefins, such as polypropylene, high density polyethylene, low density polyethylene; polyolefin copolymers, such as ethylene/ethyl acrylate copolymers, ethylene/acrylic acid copolymers, and ethylene/vinyl acid copolymers; fluoropolymers, such as polyvinylidene fluoride and ethylene/tetrafluoroethylene copolymers; polyester; nylon; polyvinylchloride; and natural or synthetic rubber. The thickness of the backing material is dependent on the roughness of the surface and the required recovery force. Thus, the backing can be of any desired thickness; however, preferably it ranges from about 25 μm to about 250 μm, and more preferably from about 25 μm to about 100 μm.

The intermediate layer can be a material that has greater conformability to the substrate than does the backing material, although this is not a requirement. Preferably, the intermediate layer has an recovery force less than the recovery force of the backing material. Furthermore, the recovery force of this type of intermediate layer should be small enough such that the adhesive does not substantially debond from the rough substrate, although it will be understood that a minor amount of localized debonding can be tolerated without causing the tape to detach from the rough surface. This type of intermediate layer can include, for example, woven materials such as textiles and nonwoven materials such as tissue paper, spun bond webs, and meltblown microfiber media. The intermediate layer can also be made of other materials, including, but not limited to collapsible foams, thin metal foils, etc. With the use of a collapsible foam, the bonding portions between the intermediate layer and the adhesive can also be indexed to the raised portions of the rough surface at the time the adhesive tape is applied to the surface. The thickness of the intermediate layer is dependent on the roughness of the surface and the strength of the material. Thus, the intermediate layer can be of any desired thickness; however, preferably it ranges from about 20 μm to about 150 μm, and more preferably from about 20 μm to about 75 μm.

As described above, this intermediate layer can be adhered to the backing using a tacking material, which can be the same or different than the material in the adhesive layer, or it can be spot-welded to the backing. The adhesive layer on the opposite surface of the intermediate layer can be continuous or discontinuous, i.e., the adhesive can define a plurality of bonding points.

Useful release materials include, but are not limited to: silicones; fluorine-containing compounds, such as polyfluoropolyethers and fluorosilicones; polyvinyl carbamates; acetates; and acrylates. Various materials and compositions useful as release materials are available commercially and are discussed in the literature. See, for example U.S. Pat. Nos. 2,532,011; 3,240,330; 3,318,852; 3,967,031; 3,978, 274; 4,822,687; 4,889,753; 5,144,051; 5,217,805; and 5,273,805. Conventional coating techniques as well as pattern coating techniques can be used to apply release materials to the tapes of the present invention.

Glass beads or other particulate material can be used in combination with the release material to generate regions in which the adhesive is not bonded to the backing, for additional advantage. Alternatively, glass beads or other particulate material can be used alone to create discontinuities of adhesion between the backing and the adhesive layer. Typically, such particulate material ranges in size from 1–25 μm, preferably 2–20 μm. Useful particulate materials include, but are not limited to: glass beads, $CaCO_3$, and $Al_2O_3$.

The adhesive used in the tapes of the present invention is not critically limiting. The adhesive can be substantially nontacky at room temperature if it becomes tacky at an elevated temperature at which it is to be used. Alternatively, the adhesive can be nontacky to the touch but aggressively tacky to other substrates. These adhesives are substrate specific and provide an appropriate adhesive bond between the substrate and the adhesive tape. The thickness of the adhesive layer is dependent on the roughness of the surface and the desired level of tack. Thus, the adhesive layer can be of any desired thickness; however, preferably it ranges from about 10 μm to about 150 μm, and more preferably from about 20 μm to about 50 μm.

Pressure sensitive adhesives are preferred for use in the embodiments of the present invention. Non-pressure sensitive adhesives such as thermally activated or solvent-activated adhesives can be used, but they are less preferred embodiments than pressure-sensitive adhesives. The benefit of a pressure sensitive adhesive is its natural flexibility and elongation properties. While the adhesive tapes of the present invention can employ a wide variety of pressure sensitive adhesives known in the art, the pressure sensitive adhesive is preferably one that is aggressively tacky and forms strong bonds on contact with substrates.

Pressure sensitive adhesives are art recognized as a standard class of materials. These are adhesives, which in solvent-free form are permanently tacky at room temperature (e.g., 20°–30° C.) and firmly adhere to a variety of dissimilar surfaces upon contact. In certain applications, it is desirable that the strength of the bond between the adhesive and the substrate surface increases with time. This capability is desirable as it allows more initial localized debonding at the adhesive/substrate surface interface to enable the tape backing to return to a smoother, flatter configuration without sacrificing the ultimate strength of adhesive bond to the substrate. The pressure sensitive adhesives also require no activation by water, solvent, or heat in order to exert a strong adhesive holding force towards such materials as paper, cellophane, glass, plastic, wood, and metals. The adhesives preferably have sufficient cohesive strength and elastic properties such that, despite their aggressive tackiness, they can be readily handled and removed from smooth surfaces without leaving a substantial residue. A variety of materials and compositions useful as pressure-sensitive adhesives are available commercially and are thoroughly discussed in the literature. See, for example, U.S. Pat. Nos. Re. 24,906; 3,551,391; 3,239,478; 3,897,295; 4,181,752; 4,223,067; 4,629,663; 4,780,367; and 4,833,179. Specific examples of preferred types of adhesives include acrylates, e.g., isooctyl acrylate/acrylic acid copolymers and tackified acrylate copolymers; natural or synthetic rubber resins such as nitrile rubbers, e.g., acrylonitrile-butadiene; silicone-based adhesives, e.g., polysiloxanes; polyolefins; polyesters; polyamides; and polyurethanes.

Conventional coating techniques utilized in the manufacture of adhesive tape constructions can be used to apply the adhesive compositions to the adhesive tapes of the present invention. These techniques include, but are not limited to, knife coating, roll coating, reverse roll coating and gravure coating techniques. The resulting coating is then passed through a heat cycle to remove the solvent or water to produce the adhesive construction. Alternatively, a solventless, curable adhesive (often referred to as 100% solids adhesive) can be applied using knife coating or metered coating techniques similar to those described above and subsequently cured to an adhesive state by exposure to ultraviolet radiation or heat. Also, the adhesive can be applied using a transfer adhesive construction.

Objects and advantages of this invention are further illustrated by the following examples, but the particular materials and amounts thereof recited in these examples as well as other conditions and details, should not be construed to unduly limit this invention. All materials are commercially available except where stated or otherwise made apparent.

EXAMPLE 1

A sheet of perforated metal having a square lattice array of 0.16 cm holes on 0.95 cm centers was placed in contact with a 0.05 mm thick polypropylene film and 3M Brand SUPER 77 spray adhesive (available from 3M, St. Paul, Minn.) sprayed onto the film through the holes in the perforated metal. An intermediate layer comprising a piece of 16.4 g/m$^2$ tissue paper (#35906, available from James River Corporation, Grouverneur, N.Y.) was laminated to a 0.05 mm thick layer of an acrylate pressure sensitive adhesive carried on a release liner. The adhesive composition is described in Example 2 of U.S. Pat. No. 4,548,862, (Hartman) which is incorporated herein by reference. The adhesive coated polypropylene film was subsequently laminated to the adhesive free face of the intermediate layer to produce a tape construction similar to that shown in FIG. 1a. After the release liner was removed, the tape construction was applied to a painted cinder block wall using sufficient finger pressure to assure good contact between the adhesive and the block surface. The polypropylene backing quickly returned to a substantially smooth, flat configuration and the tape remained adhered to the cinder block surface until it was removed several months later.

COMPARATIVE EXAMPLE 1

A conventional pressure sensitive tape construction using the same polypropylene backing and acrylate adhesive of Example I was prepared by laminating the adhesive directly to the polypropylene backing without an intermediate layer of tissue paper. When this tape construction was applied to a painted cinder block wall with finger pressure comparable to that used to apply the tape construction of Example 1, the polypropylene backing retained a dimpled surface and the tape exhibited very poor adhesion to the block surface.

EXAMPLE 2

A polypropylene film having a uniform array of adhesive spots and a tissue paper also having a uniform array of adhesive dots were prepared by spraying adhesive onto the film and tissue through perforated metal as described in Example 1. A pressure sensitive adhesive tape construction similar to that shown in FIG. 2 was prepared by laminating the adhesive coated tissue paper to the polypropylene film in a manner such that the adhesive dots on the tissue paper were offset from the adhesive dots on the polypropylene film. The tape construction was applied to a painted cinder block surface with finger pressure to assure good contact between the adhesive and the block surface. The polypropylene backing quickly returned to a substantially smooth, flat configuration and the tape remained adhered to the cinder block surface until it was removed several months later.

EXAMPLE 3

A meltblown polypropylene filter media (0.6 oz/yd$^2$, 20 gm/m$^2$ available from Kimberly-Clark, Roswell, Ga. under the tradename CYCLEAN) was ultrasonically spot bonded to 12 µm thick biaxially oriented poly (ethyleneterephthalate) (PET) film using a Branson Ultra Sonic Welder (available from Branson Ultrasonics Corp., Danbury, Conn.). The spot bonds were about 1 mm in diameter and were arranged in an approximate square lattice array about 1 cm on a side. A 75 µm thick film of the acrylate pressure sensitive adhesive described in Example 1 was laminated to the meltblown web as a continuous film. The resulting tape construction was applied to a painted cinder block surface with sufficient finger pressure to flex the PET backing and allow the adhesive to increase its contact with the block surface. The adhesive maintained this enhanced contact with the block surface unless a spot bond was directly over a major depression, in which case the adhesive debonded from the cinder block and allowed the PET film to return to a substantially smooth, flat configuration.

This example demonstrates that a) ultrasonic welding can be used to provide spot bonds between the backing and the intermediate layer; b) backings that are difficult to stretch or distort can be sufficiently flexed locally to provide functional tapes; and c) pressure sensitive adhesives may facilitate localized debonding to permit recovery of the backing to a substantially smooth, flat configuration without detaching the adhesive tape from the substrate surface.

EXAMPLE 4

A release liner (available as POLYSLIK #SP8226 from Release International, Bedford Park, Ill.) was mechanically perforated with a 4 mm diameter tubular cutting die in a square lattice array with a 1.75 cm spacing. The perforated release liner was then coated with a monolayer of a glass beads (90% of the beads with a diameter <20 µm and 10% of the beads with a diameter <5 µm, the beads having an average diameter of 10 µm, available as #5000 uncoated beads from Potters Industries Inc., Cleveland, Ohio). A 50 µm thick layer of a high tack acrylic pressure sensitive adhesive (PSA) film on a release liner (available from 3M, St. Paul, Minn. as SCOTCH #9472 Laminating Adhesive) was then laminated to the glass bead coated surface of the perforated release liner and the perforated release liner removed. The pattern coated adhesive was then removed from its release liner and laid on an approximately 12 cm square section of a 150 µm thick sheet of rubber cut from a surgical glove (available from Baxter Health Care Corp., Valevia, Calif.) which had been taped to a bench top in a slightly stretched configuration with masking tape. The side of the PSA carrying the glass bead pattern was then laminated to the rubber sheet to produce a rubber backed tape construction similar to that shown in FIG. 3. The tape construction, including the masking tape frame, was removed from the bench top and applied to a painted cinder block surface with finger pressure. The masking tape frame, which continued to maintain the tape construction in a slightly stretched configuration, was subsequently removed from the construction by cutting the rubber backed tape with a razor blade just inside the masking tape frame.

Examination of the rubber backing with a 10× eyepiece showed that it was substantially smooth and flat except for one location where a spot bond occurred over a recess that was relatively large in area but only average in depth. During the approximately 30 minutes that this rubber backed tape was on the wall, it appeared that the strength of the adhesive bond between the PSA and cinder block wall exceeded the restoring force of the rubber backing. The tape construction was then slowly pulled from the wall while watching the peel front with the aid of the 10× eyepiece. It was evident from this examination that separation had occurred between the rubber backing and the PSA in those areas where the glass beads had been transferred to the PSA film from the perforated release liner. These separations allowed the PSA to make greater contact with the cinder block surface and hence improve the adhesive properties of the tape to a rough surface as a result of the greater contact area between the PSA and the rough surface.

The area of the PSA/rubber backing interface (spot bonds) was significantly smaller than the area of the PSA/block surface interface in the tape construction described above. This fact, coupled with the strong adhesive bond formed between the PSA and the painted block surface allowed the PSA layer to separate from the backing and remain on the wall. This problem can be overcome, however, by increasing the area of the backing/PSA interface and/or selecting a different adhesive that forms a stronger adhesive bond at the backing/PSA interface than it does at the PSA/painted block surface interface. It was also noted that the tops of some surface projections on the wall had become bonded to the rubber sheet at locations where there was not a spot bond. It is believed that the pressure at these locations was sufficient to press the glass beads into the adhesive, thereby permitting some bonding to occur. Examination of the adhesive remaining on the wall also showed that the PSA did not contact the bottom of the major recesses in the cinder block wall but it did contact the side walls of these recesses, thereby increasing the contact area of the PSA/cinder block surface interface as compared to a planar conventional tape using the same adhesive and adhesive thickness.

This example illustrates that when designing tapes of this invention, consideration should be given to adhesive selection, in that the strength of the PSA/rough surface interface may be greater than the adhesive strength of the PSA/backing interface (spot bond) and/or the restoring force (i.e. the elastic and anelastic properties) of the backing.

EXAMPLE 5

A tape was constructed as in Example 4, except that a 0.2 mm thick biaxially oriented PET film was substituted for the rubber sheet that served as the tape backing. This much stiffer backing made it very difficult to deform the tape construction and allow the adhesive to contact depressions on the block surface. The tape backing remained substantially smooth and flat and the tape construction showed a minimal increase in adhesive performance to the cinder block wall as compared to conventional tape constructions.

This example demonstrates that tape backings for the tape constructions of the invention should be reasonably resilient so as to allow the PSA to be forced into recesses on the surface and thereby increase the area of the PSA/rough surface interface.

EXAMPLE 6

An approximately 12 cm square section of the high tack acrylic PSA of Example 4 was transferred to a painted cinder block wall. A similar sized section of the silicone coated release liner was coated with the glass beads as described in Example 4 and the beads transfer laminated to the exposed adhesive. An approximately 12 cm square piece of a 75 µm thick biaxially oriented PET film was then placed over the glass bead coated adhesive and the PET film pressed against the glass bead coating by passing a hand held rubber roller (4.7 cm wide and 3.7 cm in diameter) over the laminate construction several times with moderate hand pressure to adhere the PET to the bead coated adhesive. The laminate construction was subsequently allowed to "relax" for about 10 minutes and then removed from the block surface. An examination of the tape construction indicated that bonds had formed between the adhesive and the PET at the high points on the wall, substantiating the observation made in Example 4 that the glass beads can be forced into the adhesive, thereby allowing a bond to form at the tops of the surface projections.

This example demonstrates that the present invention can provide self-indexing tapes wherein the self-indexed attachment sites supplement the spot bonds between the PSA and the tape backing. Such self-indexing tapes would place less emphasis on the spacing of the spot bonds relative to having one tape useful for a wide range in surface topographies.

The entire disclosures of each patent, patent document, and publication are incorporated herein by reference as if each were individually incorporated by reference. Although the invention has been described with respect to specific preferred embodiments, it should be appreciated that other embodiments utilizing the concept of the present invention are possible without departing from the scope of the invention. The invention, for example, is not intended to be limited to the specific adhesive tapes disclosed in the preferred embodiments; rather the invention is defined by the claims and equivalents thereof.

What is claimed is:

1. An adhesive tape for adhering to rough surfaces comprising:
   (a) a deformable backing;
   (b) an adhesive layer attached to a first surface of the backing in a manner to allow discontinuities of attachment between the backing and the adhesive layer so that under application pressure, the adhesive layer and backing deform to conform to a rough surface and, on removal of the pressure, the backing recovers to define a substantially flat and smooth surface; and
   (c) a release material on at least portions of the first surface of the backing.

2. The tape of claim 1 further including an intermediate layer interposed between the adhesive layer and the first surface of the backing, wherein the intermediate layer is discontinuously attached to the first surface of the backing.

3. The tape of claim 2 wherein the adhesive layer comprises a continuous adhesive layer.

4. The tape of claim 2 wherein the adhesive layer comprises a discontinuous adhesive layer.

5. The tape of claim 2 wherein the intermediate layer comprises a material that is deformable and has an internal recovery force that is less than the recovery force of the backing.

6. The tape of claim 5 wherein the intermediate layer is tissue paper.

7. The tape of claim 2 wherein the intermediate layer tears when subjected to application pressure.

8. The tape of claim 2 wherein the intermediate layer is thermomechanically bonded to the backing at selected locations.

9. The tape of claim 2 wherein the intermediate layer is mechanically bonded to the backing at selected locations.

10. The tape of claim 2 wherein the intermediate layer is adhesively bonded to the backing at selected locations.

11. The tape of claim 1 wherein the release material comprises silicone.

12. The tape of claim 11 wherein the adhesive forms a continuous layer.

13. The tape of claim 1 wherein at least some of the attachment sites between the adhesive layer and the backing are indexed to the high points on the rough surface.

14. The tape of claim 1 wherein at least some of the attachment sites between the adhesive layer and the backing are indexed to the high points on the rough surface.

15. The tape of claim 1 wherein a second surface of the backing comprises a wall decoration.

16. The tape of claim 15 wherein the tape is wall paper.

17. An adhesive tape for adhering to rough surfaces comprising:

(a) a deformable backing;
   (b) an adhesive layer attached to a first surface of the backing in a manner to allow discontinuities of attachment between the backing and the adhesive layer so that under application pressure, the adhesive layer and backing deform to conform to a rough surface and, on removal of the pressure, the backing recovers to define a substantially flat and smooth surface; and
   (c) a layer of particulate material interposed between the adhesive layer and the first surface of the backing.

18. The tape of claim 17 wherein the adhesive layer comprises a continuous adhesive layer.

19. The tape of claim 17 wherein the adhesive layer comprises a discontinuous adhesive layer.

20. The tape of claim 17 wherein at least some of the attachment sites between the adhesive layer and the backing are indexed to the high points on the rough surface.

21. The tape of claim 17 wherein a second surface of the backing comprises a wall decoration.

22. The tape of claim 21 wherein the tape is wall paper.

23. The tape of claim 17 further including a release material on at least portions of the first surface of the backing.

24. The tape of claim 23 wherein the release material comprises silicone.

25. The tape of claim 17 wherein the layer of particulate material is a patterned layer.

* * * * *